United States Patent [19]

Patton et al.

[11] 4,088,154

[45] May 9, 1978

[54] AUTOMATICALLY CONTROLLED DESURGING SYSTEM

[75] Inventors: Bobbie J. Patton, Dallas; John W. Harrell, Duncanville, both of Tex.

[73] Assignee: Mobil Oil Corporation, New York, N.Y.

[21] Appl. No.: 693,680

[22] Filed: Jun. 7, 1976

[51] Int. Cl.$^2$ .............................................. F16L 55/04

[52] U.S. Cl. ........................................ 138/30; 138/26; 137/207

[58] Field of Search ..................... 138/30, 26; 137/207, 137/209, 593; 220/85 B

[56] References Cited

U.S. PATENT DOCUMENTS

| | | | |
|---|---|---|---|
| 2,712,831 | 7/1955 | Day | 138/26 |
| 2,845,951 | 8/1958 | Hugley et al. | 138/30 |
| 2,875,787 | 3/1959 | Evans | 138/30 |
| 3,103,234 | 10/1963 | Washburn | 138/30 |
| 3,309,656 | 3/1967 | Godbey | 73/152 |
| 4,014,213 | 3/1977 | Parquet | 138/30 |

*Primary Examiner*—Richard E. Aegerter
*Assistant Examiner*—Willis Little
*Attorney, Agent, or Firm*—C. A. Huggett; George W. Hager, Jr.

[57] ABSTRACT

A desurging system is placed in the fluid flow line near the output of a fluid pump to remove pressure fluctuations created in the flowing fluid by action of the fluid pump. The fluid passes through a gas-loaded, diaphragm type, fluid desurger.A gas volume control unit automatically controls the gas volume in the desurger by controlling both the gas-charging and the gas-discharging operations in response to measurements of the gas volume in the desurger and the gas flow rate into and out of the desurger. A diaphragm protection control unit is responsive to a measurement of the differential pressure across the diaphragm of the desurger to automatically bleed off the gas pressure in the desurger any time that such pressure exceeds the strength limitations of the diaphragm.

14 Claims, 4 Drawing Figures

FIG. 3
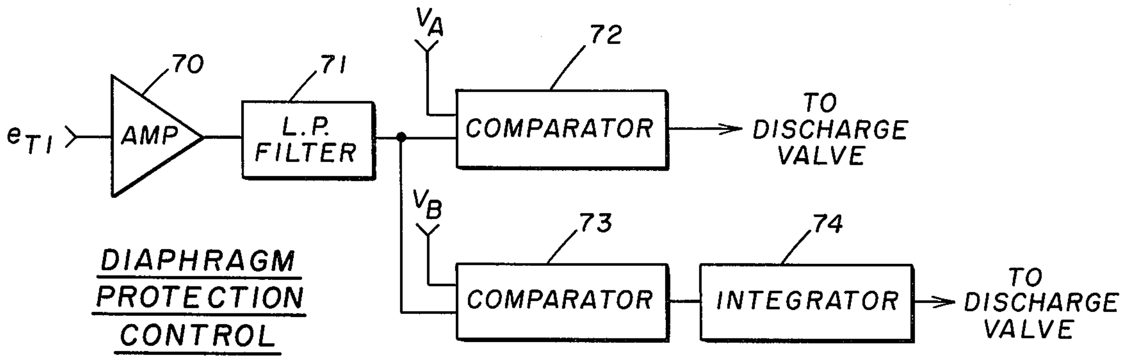
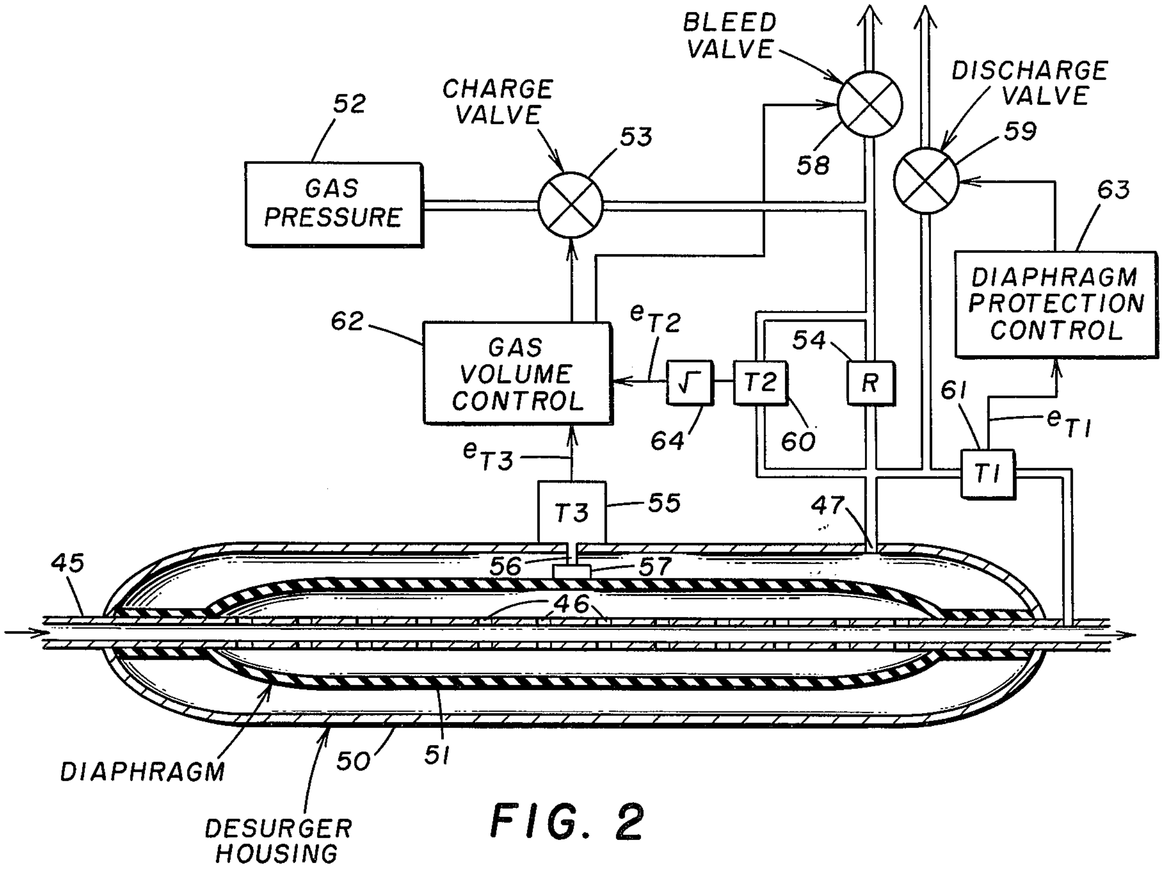
FIG. 2

AUTOMATICALLY CONTROLLED DESURGING SYSTEM

BACKGROUND OF THE INVENTION

This invention relates generally to the control of pressure fluctuations in a liquid medium and more particularly to an automatically controlled desurging system for decreasing pressure fluctuations in a fluid pumping system.

One of the principal applications of conventional hydraulic desurgers is the elimination of pressure fluctuations of fluid being pumped through a pipeline. Pumping systems employing a piston or positive-displacement type pump to circulate fluid through a pipeline impart surges or pressure fluctuations to the fluid on each pump stroke. Such pressure fluctuations create a hammer effect in the fluid system that can severely damage the system equipment. In the past it has been conventional practice to couple to the pump outlet a standard, gas-loaded, hydraulic desurger to reduce these fluctuations.

More recently, such a standard, gas-loaded, hydraulic desurger has been employed to reduce noise levels in the circulating drilling fluid of logging-while-drilling systems. An example of such a system is disclosed in U.S. Pat. No. 3,309,656 to John K. Godbey. In the Godbey system, drilling fluid is continuously circulated downward through the drill string and drill bit and upward through the annulus provided by the drill string and the borehole wall, primarily for the purpose of removing cuttings from the borehole. An acoustic transmitter located downhole continuously interrupts the flow of the drilling fluid, thereby generating an acoustic wave in the drilling fluid. The acoustic wave is modulated with information measured downhole by sensing apparatus, and the modulated acoustic wave is telemetered uphole through the drilling fluid to suitable recording equipment.

However, logging-while-drilling systems utilizing the circulating drilling fluid as a medium for telemetry have obvious difficulties in that any extraneous vibrations, shocks, etc., of the drilling equipment impart unwanted pressure waves or "noise" to the fluid which may seriously interfere with the acoustic signal being telemetered uphole in the drilling fluid at that time. This noise may be generally classified as either "downhole" or "uphole" noise, depending on the source of the unwanted pressure waves. Uphole noise, itself, originates from a variety of sources, the most prominent being the pumps which circulate the fluid through the drilling system. These pumps, which are of the piston, positive-displacement type, impart pressure surges or noise to the drilling fluid on each pump stroke. This noise has been reduced by coupling a conventional, gas-loaded, hydraulic desurger in the fluid flow line near the pump output as disclosed in the aforementioned patent to Godbey.

SUMMARY OF THE INVENTION

In accordance with the present invention a gas-loaded hydraulic desurger, of the type having a flexible diaphragm dividing the desurger into a first chamber pressurized from a gas supply and a second chamber through which a flowing fluid is passed, is automatically controlled to maintain a desired gas volume in the first chamber, whereby pressure fluctuations in the fluid flowing through the second chamber are minimized. In this aspect, the gas pressure in the first chamber is varied so as to maintain a predetermined ratio of the gas volume in the first chamber to the fluid volume in the second chamber. A first signal is produced when the gas volume in the first chamber drops below a predetermined lower limit, and a second signal is produced when the gas volume in the first chamber exceeds a predetermined upper limit. The first chamber is charged with gas in response to the first signal, and gas is discharged from the first chamber in response to the second signal.

In a further aspect, the charging or discharging gas flow rate is monitored and a signal produced indicating the amount of change in the gas volume of the first chamber due to such charging or discharging. The charging or discharging of the first chamber is terminated when the change in the gas volume reaches a predetermined level.

In a still further aspect, the pressure differential between the first and second chambers is measured and gas is discharged from the first chamber when the pressure differential exceeds a predetermined limit.

BRIEF DESCRIPTION OF THE DRAWINGS

FIG. 2 illustrates the desurging system of the present invention.

FIG. 3 is an electrical schematic of the bladder protection control portion of the desurging system of FIG. 2.

DESCRIPTION OF THE PREFERRED EMBODIMENT

In accordance with the present invention an automatically controlled gas-loaded desurger system is provided for controlling unwanted pressure surges in the fluid flow line of a fluid pumping system.

Figure 1:
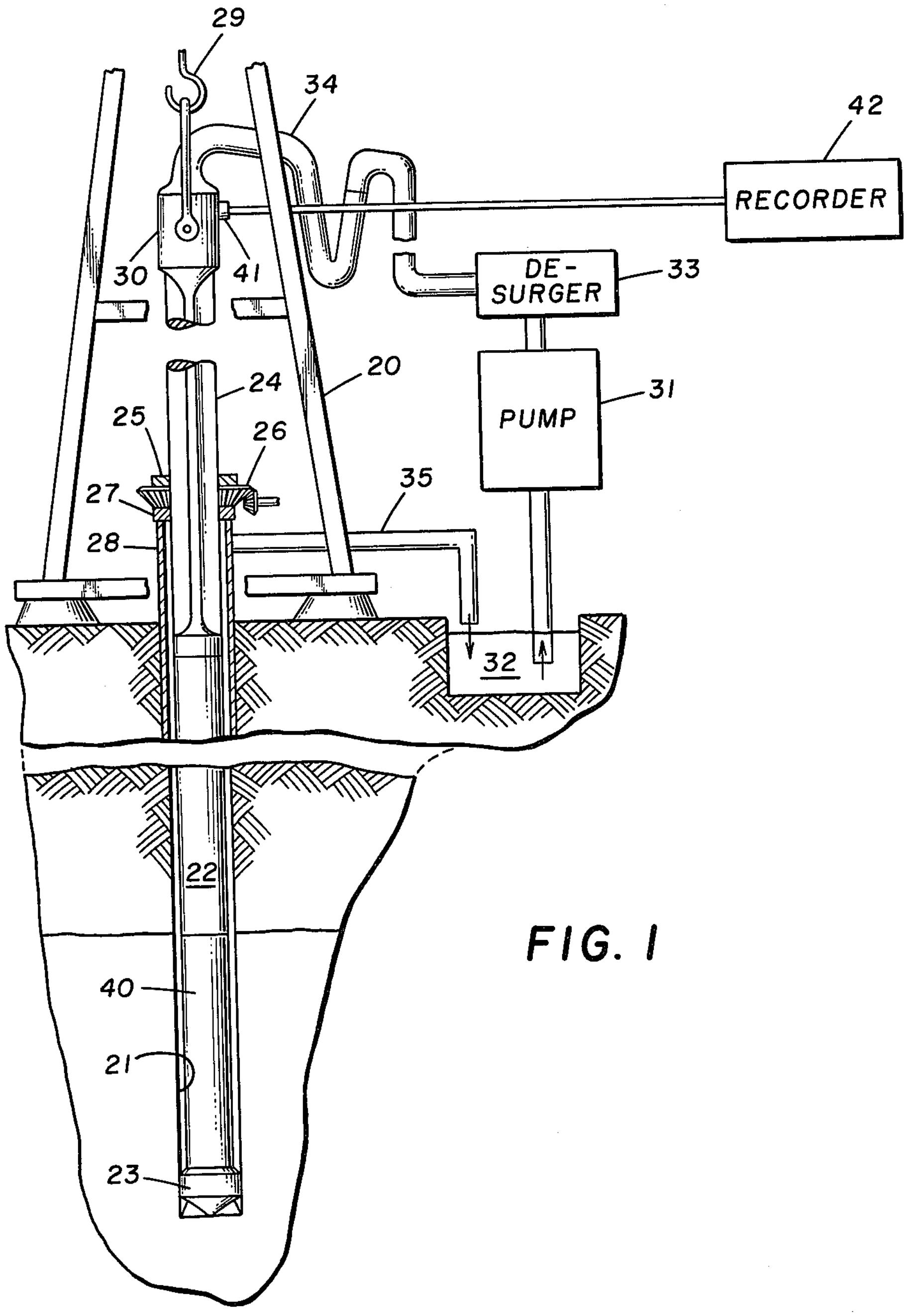
FIG. 1 illustrates a well drilling system with which the desurging system of the present invention may be employed.

A brief description of a typical fluid pumping system with which this invention can be used will be given prior to the detailed description of the invention itself. In FIG. 1 there is shown a conventional logging-while-drilling system. A derrick 20 is located over a well 21 being drilled in the earth by rotary drilling. A drill string 22 is suspended within the well 21 from the derrick 20. The drill string 22 includes a plurality of sections of drill pipe with one or more drill collars and a drill bit 23 secured at its lower end and a kelly 24 secured at its upper end. Kelly 24 extends through and is rotatably engaged by rotary table 25. A suitable prime mover (not shown) drives a member 26 which rotatably engages the rotary table 25, thereby rotating the drill string 22 within the well 21. The member 26 is superimposed directly above the wellhead 27. The wellhead 27 is secured to a casing 28 which is cemented into position a short distance into the well 21. A hook 29 is connected to the kelly 24 through a rotary swivel 30. Hook 29 is attached to a traveling block (not shown) which in turn is suspended by a suitable cable (also not shown). The rotary swivel permits rotation of the drill string relative to the hook and traveling block.

The swivel 30 also forms a fluid connection between a source of drilling fluid, such as mud, and the drill string 22. A pump 31 transfers the drilling fluid from a pit 32 in the earth through a desurger 33, which is adapted to suppress noise in the drilling fluid, and a flexible hose 34 into the swivel 30. The drilling fluid then flows downwardly into the drill string 22 and exits through openings in the drill bit 23 into the well 21. The drilling fluid then circulates upwardly from the drill bit 23, carrying formation cuttings through the annulus between the drill string 22 and the well 21 to the surface of the earth. A pipe 35 is connected to the casing 28 for returning the drilling fluid from the well 21 to the pit 32.

Located within the drill string 21 near the drill bit is a downhole logging tool 40 which includes one or more transducers for measuring downhole conditions and an acoustic transmitter which produces an acoustic signal in the drilling fluid representative of the downhole conditions. This acoustic signal is telemetered uphole through the drilling fluid where it is received by one or more transducers 41 mounted on the swivel 30. The signals from transducers 41 are applied to a recording system 42 which provides readout functions representative of the measured downhole conditions.

It has been conventional practice in logging-while-drilling systems such as has been described in conjunction with FIG. 1 to employ gas-loaded, hydraulic desurgers for the desurger 33 to reduce the pressure fluctuations in the circulating drilling fluid created by positive-displacement type fluid pumps, such as pump 31. Such pressure fluctuations create a noise level in the circulating drilling fluid that interferes with the acoustic signal being telemetered from the downhole logging tool 40 through the drilling fluid to the uphole transducer 41 and the recorder 42. This noise level is significantly reduced by employing a gas-loaded desurger in the fluid line near the output from pump 31.

Such a typical in-line, gas-loaded desurger is illustrated at 50 in FIG. 2 and comprises a conduit 45 enclosed in housing 50. Flexible diaphragm 51 surrounds conduit 45 throughout its length and is hermetically sealed thereto at both its ends. Conduit 45 has a plurality of perforations 46 therein which communicate the interior of conduit 45 to the interior of the sealed diaphragm 51. Housing 50 has an inlet 47 through which the gas volume of housing 50 may be charged and discharged. The efficiency of the desurger in eliminating fluid pressure fluctuations to thereby reduce system noise is proportional to the ratio of this gas pressure surrounding the diaphragm to the fluid pressure within the diaphragm. Standard practice in desurger gas charging is to precharge the gas pressure to a value nominally about 70% of the anticipated operating drilling fluid pressure. Adjustments to the pressure precharge can only be made when the drilling fluid pump is OFF. Consequently, the efficency of the desurger to minimize noise levels in the circulating drilling fluid is limited by the skill of the operator in anticipating the correct operating drilling fluid pressure and by changes in the nominal drilling fluid pressure itself while the pump is operating. Further, the precharge pressure is limited by the strength of the diaphragm. Too great a precharge can cause extrusion and damage to the diaphragm, especially during long periods of time that the pump is inoperative and at those times when the pump is being turned ON and OFF.

It is, therefore, a specific aspect of the present invention to provide a gas-loaded desurging system that automatically allows the gas pressure surrounding the diaphragm in the desurger to change to any desired value necessary to permit optimum desurging of the circulating drilling fluid irrespective of changes in the nominal flow rate while the drilling fluid pump is operative and, additionally, provides for automatic bleeding of the gas pressure at any time the pressure exceeds the strength limitations of the diaphragm.

Referring now to FIG. 2, there is illustrated a preferred embodiment for the automatically controlled, gas-loaded desurging system of the present invention. As described above, the desurger 50 is placed in-line with the fluid flow so that the fluid passes through the desurger as shown in FIG. 2. The desired gas volume within the desurger is maintained under operating conditions by the gas pressure source 52, the charge valve 53, the bleed valve 58, the discharge valve 59, and the orifice 54. A differential pressure transducer 60 and square root detector 64 provide a signal $e_{T2}$ that is a measure of the pressure drop across the orifice. A differential pressure transducer 61 provides a signal $e_{T1}$ that is a measure of the differential pressure between the gas volume within the desurger and the fluid flow through the desurger. A gas volume transducer 55 provides a signal $e_{T3}$ that is a measure of the volume of the gas within the desurger. The source of gas pressure 52 may be conventional high-pressure bottled gas, nitrogen, for example, or a mechanical air compressor which maintains a ready volume of high-pressure air.

The automatic gas volume control feature of the present invention is carried out by the gas volume control unit 62 in response to the signals $e_{T2}$ and $e_{T3}$, while the automatic bladder protection feature is carried out by the bladder protection control unit 63 in response to the signal $e_{T1}$ from the transducer 61. A detailed description of these automatic control features of the present invention will now be made in conjunction with circuitry illustrated in FIGS. 3 and 4.

The automatic diaphragm protection control unit 63 is illustrated in detail in FIG. 3. The signal $e_{T1}$ from differential pressure transducer 61 is applied through the amplifier 70 and low-pass filter 71 to a pair of comparators 72 and 73. Amplifier 70 may be provided with a gain adjustment so that its output sensitivity may be adjusted to any desired value. A suitable value of output sensitivity for use with a 3000-psi Westinghouse in-line, gas-loaded desurger is 1 volt per 100-psi differential pressure. For such a desurger, a differential pressure across the diaphgram of no more than 1000 psi is recommended for short time periods and of no more than 600 psi for time periods greater than three hours. Low-pass filter 71 is provided as a protection against the discharge valve's being opened due to transients in the differential pressure. Comparator 72 compares the amplified and filtered $e_{T1}$ signal to a reference voltage $V_A$ and generates an output signal for opening the discharge valve whenever signal $e_{T1}$ exceeds the reference voltage $V_A$. A suitable value for reference voltage $V_A$ is 10 volts for an amplifier sensitivity of 1 volt per 100-psi differential pressure. The discharge valve will be opened, therefore, whenever the differential pressure across the diaphragm exceeds 1000 psi to automatically bleed off the gas volume in the desurger until such differential pressure drops back to or below the 1000-psi level. Further, comparator 73 compares the amplified and filtered signal $e_{T1}$ to a reference voltage $V_B$ and provides an output signal to the time integrator 74 whenever signal $e_{T1}$ exceeds the reference voltage $V_B$. A suitable reference voltage $V_B$ of 6 volts will permit the integrator 74 to be triggered whenever the differential pressure across the diaphragm exceeds 600 psi. Should this differential pressure exceed 600 psi for a selected time period, the integrator provides an output signal for opening the discharge valve to automatically bleed off the gas volume in the desurger until such differential pressure drops back to or below the 600-psi level.

Figure 4:
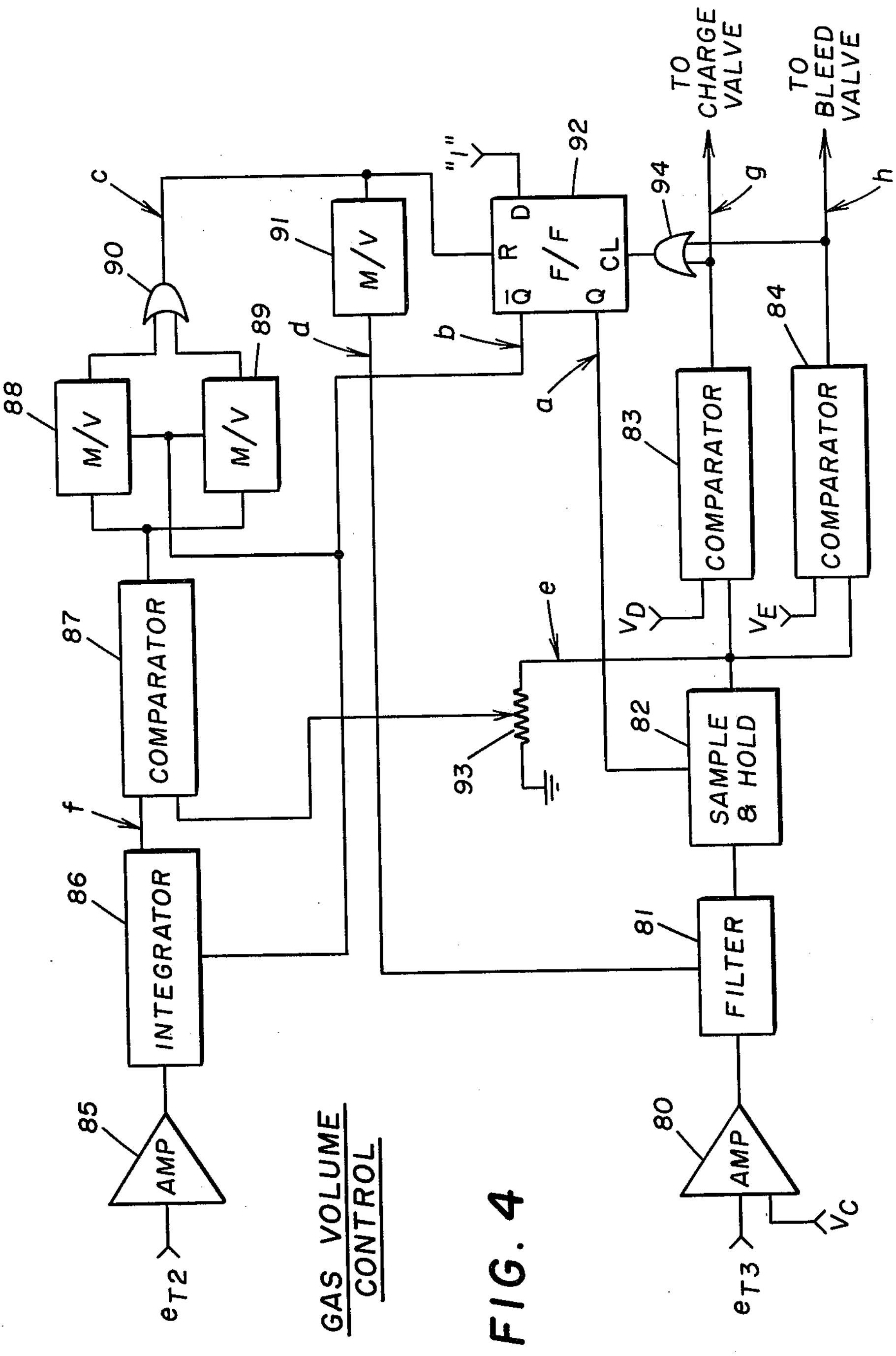
FIG. 4 is an electrical schematic of the gas volume control portion of the desurging system of FIG. 2.

The automatic gas volume control unit 62 is illustrated in detail in FIG. 4. The signal $e_{T3}$ from the gas volume transducer 55 is applied to the input of amplifier 80 as a measure of the gas volume in the desurger. The gas volume transducer 55, shown in the preferred embodiment of FIG. 2, is a displacement-type transducer attached so as to measure the deflection of the bladder under the influence of both the fluid pressure within the diaphragm and the gas pressure surrounding the bladder as supplied by the gas pressure unit 52. A rod 56 extends from the transducer into the gas volume portion of the desurger and is positioned against the surface of the bladder by means of the shoe 57. Displacement of the rod 56 by deflection of the diaphragm is sensed by the transducer 55. A suitable transducer may be a conventional, linear, variable-differential transformer or linear potentiometer capable of providing an output signal $e_{T3}$ representative of the displacement of the rod 56. Consequently, signal $e_{T3}$ is a measure of the gas volume in the desurger when the desurging system is operative.

Other suitable means for measuring gas volume may be used. For example, a strain-sensitive resistor may be affixed around the circumference of the diaphragm in such a manner that the diameter of the diaphragm is sensed as a measure of the size of the diaphragm and, consequently, be representative of a measure also of the gas volume. Alternatively, the strain-sensitive resistor may be affixed along the length of the diaphragm to detect the arc length of the diaphragm and, consequently, be representative of a measure again of the gas volume. It can, therefore, be understood that any suitable transducer may be utilized in conjunction with the diaphragm so long as its output signal $e_{T3}$ is representative of the gas volume in the desurger under operating conditions.

Also applied to amplifier 80 is a reference voltage $V_C$ that is proportional to the desired gas volume in the desurger. Amplifier 80 sums the $e_{T3}$ signal and reference voltage $V_C$ to produce a gas volume error signal $\Delta e_{T3}$ which is a measure of the deviation of the actual desurger gas volume from the desired desurger gas volume. This signal $\Delta e_{T3}$ may fluctuate substantially with cycles of the drilling fluid pump. A low-pass filter 81 smooths out such fluctuations and provides a signal that is a measure of the average gas volume error over a period of time controlled by the time constant of the filter. The sample and hold unit 82 transfers this average gas volume error signal to its output for comparison with reference voltages $V_D$ and $V_E$. Voltage $V_D$ represents a preset lower limit for the desurger gas volume, while $V_E$ represents a preset upper limit. Should the average gas volume error drop below the reference voltage $V_D$, comparator 83 will provide the signal *g* to operate the charge valve and thereby allow charging of the desurger gas volume from the gas pressure supply. Alternatively, should the average gas volume error exceed the reference voltage $V_E$, comparator 84 will provide the signal *h* to operate the bleed valve and thereby allow discharging of the desurger gas volume. Either of the signals *g* or *h* from comparators 83 and 84, respectively, clocks flip-flop 92 by way of gate 94. The Q input of flip-flop 92 is the signal *a* which maintains the sample and hold unit 82 in the hold mode to permit the charging or discharging of the desurger to continue until a desired gas volume correction has been achieved. The actual measure of the gas volume correction and the termination of the charging and discharging of the desurger as carried out by the operation of the units 85–93 will now be described.

Transducer 60 provides a measure of the square of the pressure drop across orifice 54 and is, consequently, indicative of the charging or discharging gas flow rate through the orifice to the desurger. Detector 64 is utilized to provide the signal $e_{T2}$ representing the square root of the output from the transducer 60. A suitable square root detector is, for example, a National Semiconductor LX Series Transducer. Amplifier 85 applies this $e_{T2}$ signal to the summing integrator 86. The $\overline{Q}$ output of flip-flop 92 is the signal *b* which sets the integrator 86 to start the integration of the output of amplifier 85. Integrator 86 then provides the signal *f* which is proportional to the amount of gas volume correction which has been made by the charging and discharging of the desurger. When this measured gas volume correction becomes equal to a fraction of the measured average gas volume error of signal *e*, as preset by the variable resistor 93, the comparator 87 is triggered so as to effect the termination of the charging or discharging of the desurger in the following ways.

During a charging cycle, signal *f* of integrator 86 represents the volume of gas added to the desurger from the time the charge valve was opened. Whenever this value is equal to the reference voltage from resistor 93, the output of comparator 87 goes to logic "0". This triggers the negative-edge triggered multivibrator 89 to produce a logic pulse which is passed through gate 90 as signal *c*. Signal *c* triggers multivibrator 91 to produce a pulse which is applied as the signal *d* to reset filter 81. Signal *c* also resets flip-flop 92 to remove the signal *a* from sample and hold 82 so as to release the hold on its output signal *e*. The charging cycle is terminated and no further desurger charging or discharging is carried out until the average gas volume error, as represented by signal *e*, again exceeds the preset lower and upper limits for the desurger gas volume, as represented by the reference voltages $V_D$ and $V_E$, respectively.

During a discharging cycle, signal *f* of integrator 86 represents the volume of gas removed from the desurger from the time the bleed valve was opened. During the discharging cycle, signal *e* from sample and hold 82 is of opposite polarity from its polarity during the charging cycle. This causes the comparator 87 to go to logic "1" when the value of signal *f* equals the reference voltage from resistor 93. This triggers the positive-edge triggered multivibrator 88 to produce a logic pulse which is passed through gate 90 as signal *c*. Multivibrator 91 and flip-flop 92 again respond to signal *c*, as has been described above for the charging cycle, to effect termination of the discharging cycle. Again, no further desurger charging or discharging is carried out until the average gas volume error exceeds the preset lower and upper limits for the desurger gas volume.

It is to be understood that the foregoing-detailed description of the desurging system of the present invention represents the operation of one embodiment of the invention suitable for use in the fluid flow line of a logging-while-drilling system. This desurging system may be utilized with various modifications and various types of fluid flow systems other than logging-while-drilling systems without departing from the scope and spirit of the invention as hereinafter defined by the appended claims.

We claim:

1. In a gas-loaded hydraulic desurger of the type having a flexible diaphragm dividing said desurger into a first chamber pressurized from a gas supply and a second chamber through which flowing fluid is passed, the method of controlling the gas pressure in said first chamber comprising the steps of:
(a) measuring the gas volume within said first chamber,
(b) comparing the measured gas volume with predetermined upper and lower limits for the gas volume,
(c) charging the gas pressure in said first chamber should the measured gas volume fall below said lower limit,
(d) discharging the gas pressure in said first chamber should the measured gas volume exceed said upper limit,
(e) measuring the gas flow rate into and out of said first chamber during charging and discharging of said gas pressure,
(f) determining from said measured gas flow rate the amount of change in said measured gas volume due to the charging or discharging of said gas pressure, and
(g) terminating the charging or discharging of said gas pressure when the change in said measured gas volume reaches a first level.

2. The method of claim 1 wherein said first level is representative of a predetermined proportion of said measured gas volume.

3. The method of claim 1 wherein the gas pressure in the first chamber is controlled so that a predetermined pressure differential between said first and second chambers is not exceeded.

4. The method of claim 3 wherein the step of controlling gas pressure in the first chamber comprises the steps of:
(a) measuring the differential pressure between said first and second chambers, and
(b) discharging the gas pressure in said first chamber should said pressure differential reach a predetermined level.

5. The method of claim 4 wherein said predetermined level is representative of a strength limitation of said diaphragm.

6. A system for controlling the charging and discharging of a gas-loaded hydraulic desurger of the type having a flexible diaphragm dividing said desurger into a first chamber pressurized from a gas supply and a second chamber through which flowing fluid is passed so as to minimize any pressure fluctuations of the flowing fluid, comprising:
(a) means for producing a first signal when the gas volume in said first chamber drops below a predetermined lower limit and a second signal when the gas volume in said first chamber exceeds a predetermined upper limit,
(b) means responsive to said first signal for charging said first chamber with gas from said gas supply,
(c) means responsive to said second signal for discharging gas from said first chamber,
(d) means for measuring the charging or discharging gas flow rate, and
(e) means responsive to said measured gas flow rate for indicating the amount of change in said gas volume due to a charging or discharging of said first chamber.

7. The system of claim 6 further including means for discharging gas from said first chamber when the pressure differential between said first and second chambers exceeds a predetermined limit.

8. The system of claim 7 wherein said means for producing said first control signal includes:
(a) a first reference signal representative of said desired gas volume,
(b) means responsive to said measured gas volume and said first reference signal for producing an error signal representative of the deviation of the measured gas volume from the desired gas volume,
(c) a second reference signal representative of said predetermined lower limit for said gas volume, and
(d) means for comparing said error signal and said second reference signal to produce said first control signal when said error signal indicates that the measured gas volume has dropped below the predetermined lower limit for said desired gas volume.

9. The system of claim 3 wherein said means for producing said second control signal includes:
(a) a first reference signal representative of said desired gas volume,
(b) means responsive to said measured gas volume and said first reference signal for producing an error signal representative of the deviation of the measured gas volume from the desired gas volume,
(c) a third reference signal representative of said predetermined upper limit for said gas volume, and
(d) means for comparing said error signal and said third reference signal to produce said second control signal when said error signal indicates that the measured gas volume has exceeded the predetermined upper limit for said desired gas volume.

10. In a gas-loaded, hydraulic fluid desurging system having a housing divided by means of a flexible diaphragm into a first chamber which is pressurized from a gas supply and into a second chamber through which a flowing fluid is passed, the improvement comprising:
(a) a first transducer for measuring the gas volume in said first chamber,
(b) means for producing a first control signal when said measured gas volume drops below a predetermined lower limit for a desired gas volume in said first chamber,
(c) means for producing a second control signal when said measured gas volume exceeds a predetermined upper limit for a desired gas volume in said first chamber,
(d) a first valve responsive to said first control signal for charging said first chamber with gas from said gas supply,
(e) a second valve responsive to said second control signal for discharging gas from said first chamber,
(f) a second transducer for measuring the charging and discharging gas flow rate into and out of said first chamber,
(g) means responsive to said measured gas flow rate for indicating the amount of change in said gas volume due to gas charging or discharging of said first chamber, and
(h) means for terminating said first and second control signals when the change in said gas volume reaches a predetermined level.

11. The system of claim 10 wherein said predetermined level is a predetermined proportion of said desired gas volume.

12. The system of claim 10 further including:

(a) a third transducer for measuring the pressure differential across said diaphragm, (b) means for producing a third control signal when said pressure differential exceeds a predetermined limit, and (c) a third valve responsive to said third control signal for discharging gas from said first chamber.

13. The system of claim 12 wherein said means for producing said third control signal includes:

(a) a third reference signal representative of a first desired pressure differential limitation, and (b) a first comparator for producing said third control signal when the pressure differential measurement from said third transducer exceeds the pressure differential limitation of said third reference signal.

14. The system of claim 13 further including:

(a) a fourth reference signal representative of a second desired pressure differential limitation, (b) a second comparator for producing an output when the pressure differential measurement from said third transducer exceeds the pressure differential limitation of said fourth reference signal, and (c) means for integrating the output of said second comparator to provide said third control signal when the pressure differential measurement from said third transducer exceeds the pressure differential limitation of said fourth reference signal for a predetermined time period.

* * * * *

UNITED STATES PATENT AND TRADEMARK OFFICE
CERTIFICATE OF CORRECTION

PATENT NO. : 4,088,154
DATED : May 9, 1978
INVENTOR(S) : Bobbie J. Patton and John W. Harrell It is certified that error appears in the above-identified patent and that said Letters Patent are hereby corrected as shown below:

Column 3, line 52, "efficency" should be --efficiency--.

Column 5, line 67, "input" should be --output--.

Signed and Sealed this

*Nineteenth* Day of *September 1978*

[SEAL]

*Attest:*

RUTH C. MASON
*Attesting Officer*

DONALD W. BANNER
*Commissioner of Patents and Trademarks*